A. LAURIE.
GUARD SHOE FOR MOWERS.
APPLICATION FILED AUG. 16, 1920.
1,391,128. Patented Sept. 20, 1921.
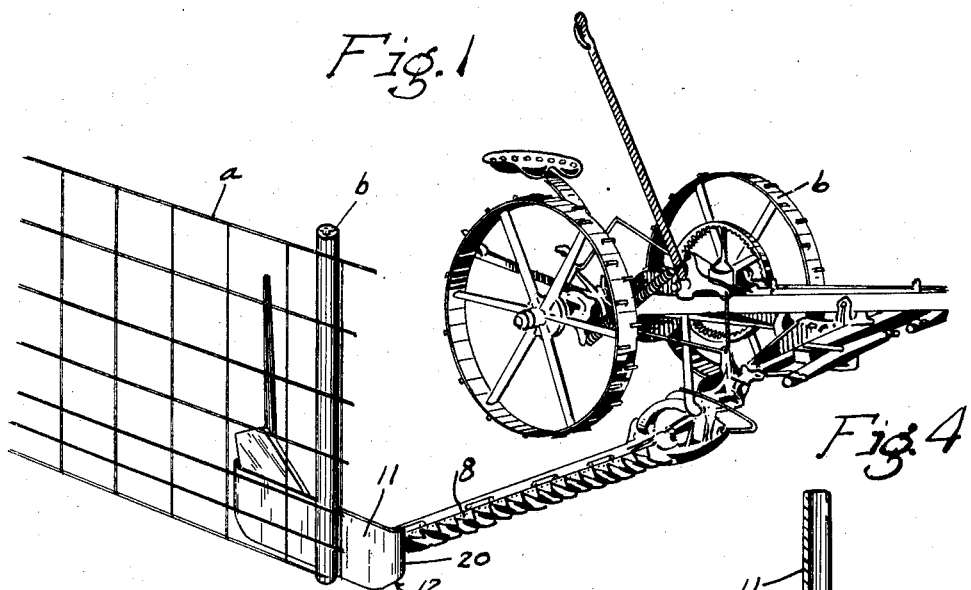
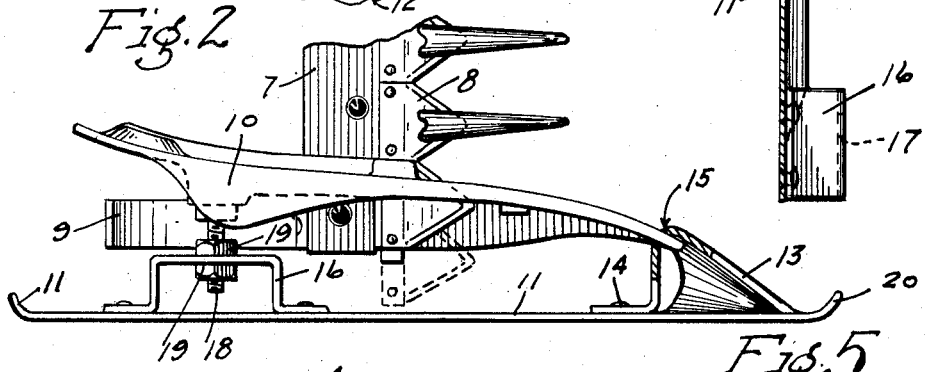
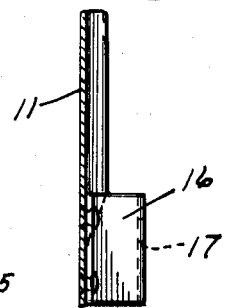
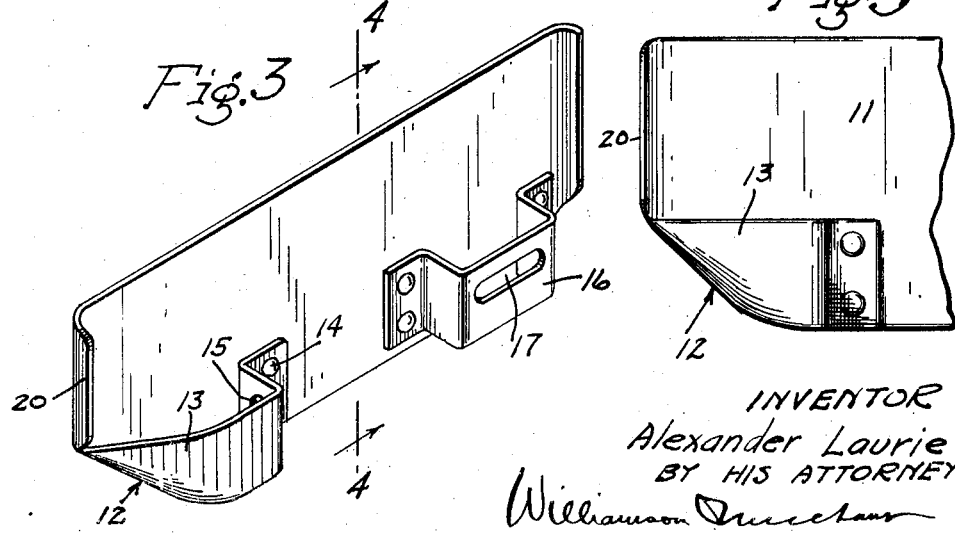
INVENTOR
Alexander Laurie
BY HIS ATTORNEYS

UNITED STATES PATENT OFFICE.

ALEXANDER LAURIE, OF CARROLL, NEBRASKA.

GUARD-SHOE FOR MOWERS.

1,391,128.  Specification of Letters Patent.  Patented Sept. 20, 1921.

Application filed August 16, 1920. Serial No. 403,772.

*To all whom it may concern:*

Be it known that I, ALEXANDER LAURIE, a citizen of the United States, residing at Carroll, in the county of Wayne and State of Nebraska, have invented certain new and useful Improvements in Guard-Shoes for Mowers; and I do hereby declare the following to be a full, clear, and exact description of the invention, such as will enable others skilled in the art to which it appertains to make and use the same.

My invention provides an attachable guard shoe applicable to the outer end of the cutting bar of a mower, to prevent the same from cutting off or catching into the wires of woven wire fences or from running into fence posts, when mowing close to a fence.

In mowing grass, or the like, in fields fenced in by woven wire fences, it has hitherto been considered necessary to leave a narrow strip of uncut grass adjacent to the fence, usually on both sides thereof, and then later on, to cut these strips by the use of a hand scythe.

My invention provides a guard shoe, which, when applied to the extended end of the cutting bar of the mower beyond the outermost position of the sickle, can be run close to the woven wire fence and may even be made to scrape against the same at all times wtihout catching in the fence or damaging the fence wires or striking against the posts and damaging the mower.

The invention is illustrated in the accompanying drawings, wherein like characters indicate like parts throughout the several views.

Referring to the drawings:

Figure 1 is a perspective view showing the improved guard shoe applied to the cutting bar of the mower, and illustrating the action of the guard when the mower is working against a woven wire fence;

Fig. 2 is a plan view showing the outer end of the cutting bar, the cutting bar shoe and the guard, some parts being broken away;

Fig. 3 is a detail view in perspective showing the guard removed;

Fig. 4 is a section on the line 4—4 of Fig. 3; and

Fig. 5 is a detail in side elevation showing the front end portion of the guard.

The character *a* indicates an ordinary woven wire fence, supported by posts *b*. A mower of standard construction is indicated as an entirety by the numeral 6, but certain parts thereof should be specifically noted as follows: the cutting bar 7, the sickle 8, the outer end shoe 9 and the grain guard 10, all of said specifically noted parts being of usual arrangement, wherein the shoe and grain guard are secured to the outer end of the cutting bar 7.

In the usual operation of the mower, in an attempt to cut close to a woven wire fence, the grain guard 10 will catch the wires of the fence and either break or cause the wires to be cut by the sickle; or, in some instances, the grain guard will catch against a fence post and cause the cutting bar to be bent.

The improved guard shoe is a flat plate-like structure set edgewise in a vertical plane and preferably made of stamped sheet metal, the body thereof being indicated by the numeral 11. The front end of the guard shoe 11, at its lower portion, is curved inward, upward and rearward to afford a runner 12 so as to cause the guard shoe 11 to travel freely over the ground. To afford an attaching bracket 13, the runner 12 is extended first rearward into parallel arrangement with the guard shoe 11, then inward into transverse relation to said guard and finally rearward against the inner face of the guard shoe 11 and rigidly secured thereto by rivets 14. A perforation 15 is formed in the transverse portion of the bracket 13 through which the point of the grain guard 10 is adapted to be projected, as shown in Fig. 2.

An approximately U-shaped bracket 16 is riveted or otherwise rigidly secured to the inner side of the guard shoe 11 at a point forward of the rear end of the latter. A considerable portion of the bracket 16 is offset from but parallel to the body of the guard shoe 11, and this portion is provided with a longitudinal slot 17, which, by means of a screw-threaded stud or bolt 18, having applied thereto a pair of opposing nuts 19, is adapted to be rigidly but detachably secured to the rear portion of the grain guard 10.

Obviously, the opposing nuts 19 permit adjustment of the guard shoe 10 to accommodate the same to mowers of different makes, while the slot 17 will compensate for varying lengths or other dimensions of the grain guard 10. Figs. 1 and 2 show the guard shoe 11 properly attached to the grain guard. It is obvious that the grain guard just described will operate, as set forth in the introductory part of this description, and will permit grass to be cut by the mower on a line almost immediately adjacent to the fence. The front end of the guard shoe 11, above the runner 12, is curved inward at 12 to prevent said shoe from catching in the wires of a fence and it will also guide the shoe 11 past the posts of the fence.

By the use of the improved guard shoe, the same may be caused to travel directly against the wires of a fence with sufficient force to press the same away from the mower so that all the grass and weeds growing directly against the fence may be cut, and, at the same time, the guard shoe will prevent the sickle bar from striking the fence posts and being bent thereby.

What I claim is:

1. The combination with a mower, of a guard shoe secured at the outer end of its finger bar and set in a vertical plane outward of the outermost position of the sickle and the grain guard.

2. The combination with a mower, of a guard shoe secured at the outer end of its finger bar and set in a vertical plane outward of the outermost position of the sickle, the front end of said guard shoe being curved inwardly toward the cutting mechanism of the mower.

3. In a mower, the combination with the finger bar, sickle and grain guard, the latter being secured to the outer end of said finger bar, of a buffer guard shoe set edgewise in a vertical plane beyond the outermost position of said sickle and detachably secured to said grain guard, the front end of said guard shoe being curved inward toward the cutting mechanism of the mower.

4. In a mower, the combination with the finger bar, sickle and grain guard, the latter being secured to the outer end of said finger bar, of a guard shoe set edgewise in a vertical plane beyond the outermost position of said sickle and detachably secured to said grain guard and having a runner-like front end, said front end of the guard shoe, above its runner, being curved inwardly, said guard shoe, at its front portion, having a laterally projecting bracket with a perforation therein into which the front end of said grain guard is projected, and a bracket on the rear portion of said guard shoe, detachably bolted to the rear portion of said grain guard.

5. In a mower, the combination with the finger bar and grain guard at the outer end thereof, of a guard shoe having a slot therein to engage over the point of the grain guard, and being adjustably connected to the rear of said guard, said shoe having a vertical flat buffer surface of considerable area whereby engagement of the grain guard or sickle with an obstacle is prevented.

6. The combination with the grain guard of a mowing machine, of a guard shoe which is hooked over the front end of the grain guard and which is bolted thereto at its rear end, and means for varying the lateral and longitudinal position of said guard shoe.

In testimony whereof I affix my signature.

ALEXANDER LAURIE.